United States Patent Office 3,660,552
Patented May 2, 1972

3,660,552
PROCESS OF MANUFACTURING CROSS-LINKED MOLDED ARTICLES
Eberhard Hinz, Neu Isenburg, Helmut Kaufer, Metzkausen, and Reiner Theobald, Frankfurt, Germany, assignors to Vereinigte Deutsche Metallwerke AG, Frankfurt am Main, Germany
Filed Mar. 19, 1970, Ser. No. 21,061
Claims priority, application Germany, Mar. 25, 1969, P 19 15 033.5
Int. Cl. B29f 1/08
U.S. Cl. 264—68
7 Claims

ABSTRACT OF THE DISCLOSURE

Improved process of forming cross-linked thermoplastic polymer molded articles by mixing the thermoplastic and a suitable free radical initiating cross-linking agent, both in solid form, at a temperature below the actuation temperature of the free radical generator and below the heat plasticization temperature of the thermoplastic polymer; injecting such mixture through a nozzle into a preheated mold under such conditions as to heat the molding material mixture passing through the nozzle to a temperature which is above the activation temperature of the free radical generator and above the melting point of the thermoplastic polymer; and holding the molding material mixture in the mold at a temperature and for a time sufficient to at least initiate cross-linking and formation of said molded article.

The invention relates to a process of manufacturing cross-linked molded articles of thermoplastic materials, particularly vinyl, acrylic and olefin homo and copolymers. It more particularly refers to such process which utilizes cross-linking agents having relatively high decomposition (active) temperatures.

It is desirable to produce molded articles based on thermoplastic polymers which have high strength, particularly at elevated temperatures, and a high resistance to external influences, particularly to the action of oxygen, sunlight and chemicals.

In order to produce such molded articles, it is known to incorporate, in high-pressure or low-pressure polyethylene at temperatures not substantially exceeding 127° C., an organic peroxide, which serves as a cross-linking agent, and at the same time at least 5 parts by weight of a filler, to mold the resulting mixture and to heat the molded mixture to temperatures of at least 135° C. (Printed German application 1,167,015.)

In order to produce a high degree of cross-linking in the molded article, it is desired to finely divide the peroxide and to evenly distribute such throughout the entirety of the thermoplastic material. It is also known to subject the mixture of the synthetic thermoplastic polymer and the cross-linking agent to an instantaneous pressure of more than 2000 kg./cm.² under such conditions that a substantial cross-linking of the material does not occur (French patent specification 1,538,988).

Peroxide-polyolefin compositions may be molded and cross-linked with the aid of conventional injection molding or transfer molding machines. The material is charged from a feed hopper into a feeder, fed at temperatures of about 150° C. and injected into a mold which has been preheated to a temperature between 200° and 260° C. (See Prospectur PRTD 179–1168 issued by U.S. Industrial Chemicals Co., Division of National Distillers and Chemical Corp., New York).

Because the organic peroxides which are often used as cross-linking agents become active and initiates cross-linking at relatively low temperatures, the nozzles used in injection molding operations may become clogged. On the other hand, the manufacture of cross-linked moldings of highly crystalline and high-molecular weight polyolefins, particularly low-pressure polyolefins, is becoming increasingly important and desirable and such polyolefins have a relatively high melting point. In view of these physical properties, it is desired to use those peroxides for cross-linking these polyolefins which decompose only at relatively high temperatures. Such peroxides have been per se described, e.g., in German patent specification No. 1,189,710 and in German patent of addition No. 1,193,670.

Where as these peroxides have great advantages because they can be incorporated into thermoplastic materials which become plastic only at relative high temperatures, the addition of these peroxides to the hot material may be accompanied by losses due to evaporation. The processing times which are available with these high temperature peroxides are often very short and secondary reactions cannot be entirely avoided. For this reason, these processes have not been commercially successful so far.

The known method of mixing the thermoplastic material with the cross-linking agent and of subjecting the mixture to very high instantaneous pressure as set forth above is complicated and suitable only for small production or pilot plant runs. The heat which is generated by this instantaneous high pressure cannot be controlled. Special equipment is required to carry out the process.

It is therefore an object of the invention to manufacture highly cross-linked molded articles of thermoplastics, particularly vinyl, olefins and acrylic homo and copolymers, having high dimensional stability and a high resistance to chemicals, low susceptibility to stress crack corrosion, increased mechanical strength, particularly at elevated temperatures, and reduced low temperature brittleness.

Other and additional objects will become apparent from a consideration of this entire specification including the claims and drawing.

These objects are accomplished according to the invention by mixing a thermoplastic material having melting points above the decomposition temperature of a given cross-linking agent with that cross-linking agent in a substantially dry solid state at room temperature; feeding the mixture at room temperature or moderately elevated temperature to a molding operation; then injection molding the amount of material required to fill the mol through one or more narrow orifices and under high pressure and at a high velocity with a simultaneous, rapid temperature rise into a mold which has been preheated to a temperature which is above the decomposition temperature of the cross-linking agent and above the melting point of the plastics material; molding and cross-linking said mixture at the same time in the mold; and then removing the molded cross-linked article from the mold.

As used herein the term "synthetic resin" or "thermoplastic" refers to polymeric materials which can repeatedly assume a plastic or soft state at elevated temperatures. Such polymers are, e.g. polyolefins, polyvinyl compounds, such as polyvinylchloride, polyvinylidenechloride, polyvinylacetate, polystyrene, polyvinylether, polymethacrylates, polyvinylcarbazole, polyvinylpyrrolidone, polyesters, e.g. carbonic acids and polyols or of dicarboxylic acids and glycol, cellulose esters, e.g., celluloseacetobutyrate, cellulose ethers, polyamides, as well as rubberlike polymers, such as polysiloxanes, polysulfides, polyisobutylene, also polyepoxides, polyurethanes, as well as mixtures and copolymers and graft copolymers of constituents of such polymers.

Compounds which are particularly desirable in carrying out the process according to the invention are polyolefins, e.g., low-pressure and high-pressure polyethylenes, also copolymers of ethylene, propylene, butylene, isobutylene, vinyl acetate and others with each other and with other monomers, in which compounds the hydrogen atoms may be entirely or partly substituted, e.g., by halogens, such as chlorine or fluorine.

Plastics materials having a high degree of crystallinity, a high molecular weight and a high melting point may also be used in the process according to the invention and may be present in a state of fine division, e.g., in the form of a powder.

Preferred cross-linking agents are chemical compounds which are capable of yielding free radicals, preferably peroxides, hydroperoxides, peracids or peresters, especially of organic character.

Such peroxides are, e.g., diacyl peroxides, such as benzoyl peroxide, lauroyl peroxide, dialkyl peroxides, such as diethyl peroxide, di-tert.butyl peroxide, diisopropyl peroxide. Hydroperoxides are, e.g., hydroxymethyl hydroperoxide, tert.butyl hydroperoxide, ethyl hydroperoxide. Peracids are, e.g., peracetic acid, perbenzoic acid, perphthalic acid, monopersuccinic acid, trimethylperacetic acid. Suitable peresters are, e.g., ethyl camphorate, or esters of perbenzoic acid, such as ethyl perbenzoate or tert.butyl perbenzoate as well as esters of 3.3-di-(tert. butylperoxi)-butane-carboxylic acid.

In a preferred embodiment of the invention, sulfur and/or carbon compounds containing one or more olefinic double bonds, may be added to the mixture of thermoplastic polymer and cross-linking agent.

The addition of sulfur has, inter alia, the effect of accelerating the cross-linking reaction and results in an improved utilization of the peroxy radicals. The addition of sulfur is particularly recommended where olefin copolymers are employed. Organic compounds having double bonds are, e.g., triallyl cyanurate, p-benzoquinone dioxime, divinylbenzene, diallylphthalate etc. These compounds may also influence the cross-linking reaction and the resulting product and may result in a higher degree of cross-linking.

Known auxiliary materials may be incorporated in the molding material mixture in known proporations for known purposes. These include, e.g., processing aids; fillers, such as carbon black, talcum, silica, silicates; lubricants; dyestuffs; pigments, such as titanium dioxide, iron oxide, phthalocyanines, metals, such as aluminum powder; stabilizers improving the resistance to light and/or heat; accelerators, such as tetramethylthiuramide sulfide; plasticizers; hardening agents; reinforcing means, such as organic, inorganic or metallic fibers, agents improving the flame resistance, such as chlorinated or brominated substances or metal oxides, particularly antimony trioxide; agents, for imparting antistatic properties, and the like.

The molding material may be fed with the aid of plungers, screws and the like. It is preferred to use a conventional injection molding or transfer molding machine, and it is preferred to feed the molding mixture to the injection or transfer molding machine at temperatures between about 20° and 110° C. A plunger or screw is preferably employed to meter that amount of the mixture which is required to fill the mold.

Injection molding machines for thermosetting materials have proven particularly desirable in carrying out the process.

In accordance with the invention, the thermoplastic material-cross-linking agent solid mixture is injected into the mold through one or more narrow orifices in the amount required to fill the mold. The narrow orifices are preferably nozzle orifices, which are about 2–8 millimeters in diameter and through which the solid molding material mixture to be cross-linked can be injected under a high pressure of, e.g., about 1800–3000 kilograms per square centimeter, within short time, e.g., within 1–6 seconds. The molding material reaches a temperature in the injection which is about 180–300° C. This temperature increase is preferably generated by frictional heat in the nozzle but may also be produced by known external means, such as heating grids, a heated torpedo, high frequency or ultrasonic energy and the like.

In accordance with the invention, the mold for receiving the injected material is preheated approximately to the same temperature, i.e., to 180–300° C., which temperature is above the decomposition (actuation) temperature of the cross-linking agent and above the melting point of the thermoplastic material.

The cross-linked molded article which has thus been molded and cross-linked at the same time is removed from the mold, preferably at an elevated temperature.

The process according to the invention will be described more fully with reference to the following examples and to the drawing, in which.

EXAMPLE 1

In a high-speed mixer, not shown, low-pressure polyethylene powder (Hostalen GM 5010; Farbwerke Hoechst) having a density of 0.955 gram per cubic centimeter, a crystallinity of about 85% and a melt index MFI 190/5 of 0.3 gram per 10 minutes is mixed for two minutes with 0.5% by weight of cumene hydroperoxide (Trigonox K 80; Oxydo, Emmerich-on-Rhine), which had previously been mixed with its own weight of paraffin oil.

Figure 1:
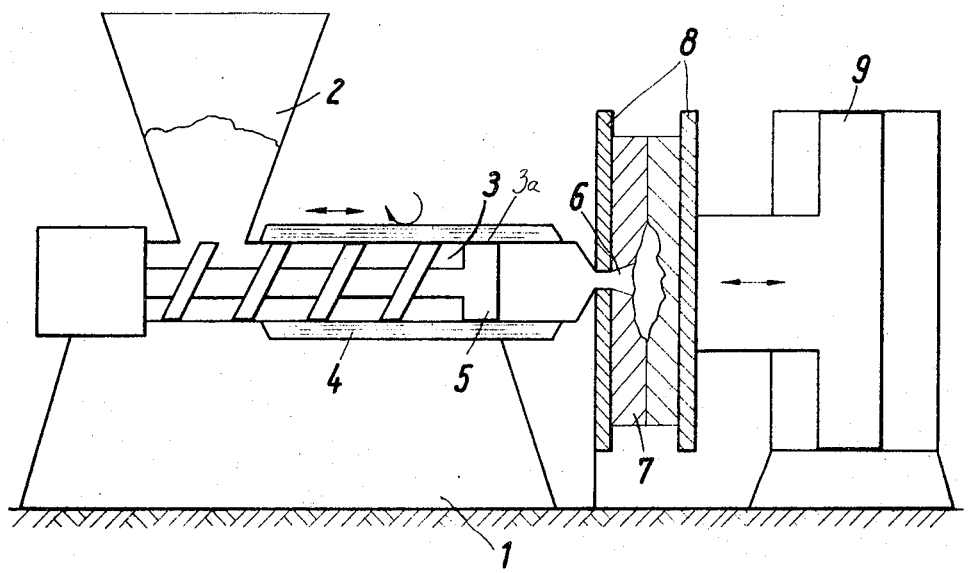
FIG. 1 is a flow scheme illustrating the process according to the invention.

Referring to FIG. 1, the mixture is fed through a barrel hopper 2 into a barrel 3 of a conventional injection molding machine 1. The cylinder 3a of the injection molding machine 1 is heated to a temperature of 100° C. by means of a pressure water jacket 4. A screw-plunger 5 is operated in the barrel 3 to inject the heated mixture therein under a pressure of 2000 kilograms per square centimeter through a nozzle 6 (sprue bushing), which is 3 millimeters in diameter, into a mold 7 within two seconds. Friction in the nozzle causes the temperature of the mixture to rise to 200° C.

The mold 7 is heated to a constant temperature of 240° C. by conventional heating cartridges which are not shown. The mold 7 is fixed to the platens of the injection molding machine 1. Heat-insulating plates 8 are interposed between the mold 7 and the platens. The cores are connected to the core-pulling cylinders, which may be hydraulically moved and controlled by the injection molding machine. The mold 7 can be opened and the closed by means of a cylinder 9.

Figure 2:
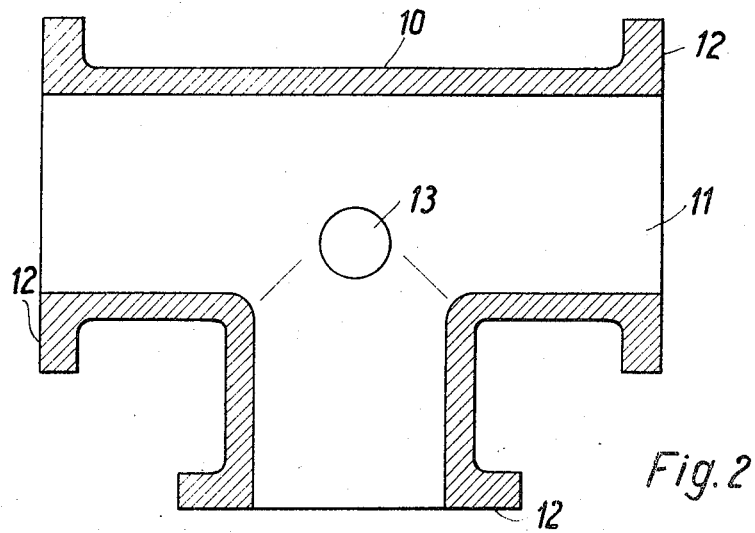
FIG. 2 is a mold which is suitable for the manufacture of T's in accordance with the invention.

One example of a molded article formed in the mold 7 is shown in FIG. 2. The mold serves to manufacture cross-linked T pipe fittings. The wall 10 of the molded article has a thickness of 3 millimeters. The overall length of the T is 200 millimeters. The length of the lateral extensions 11 are each 100 millimeters. The molding is provided with flanges 12, which have an outside diameter of 90 millimeters and an inside diameter of 50 millimeters. The sprue of the injection molding machine is disposed in the mold at 13.

The cylyinder 9 is operated after 2 minutes to open the mold 7, whereafter the cross-linked molded article is removed at a temperature of about 240° C.

The molded article was transparent and clear and had a rubber-like elasticity. When the sprue had been removed and the molded article had been cooled in the air, the T was ready for use. It was distinguished by a high stability of shape and excellent mechanical strength at elevated temperatures. The molded article is not susceptible to the formation of stress cracks and is substantially insensitive to chemical action of any kind.

EXAMPLE 2

Figure 3:
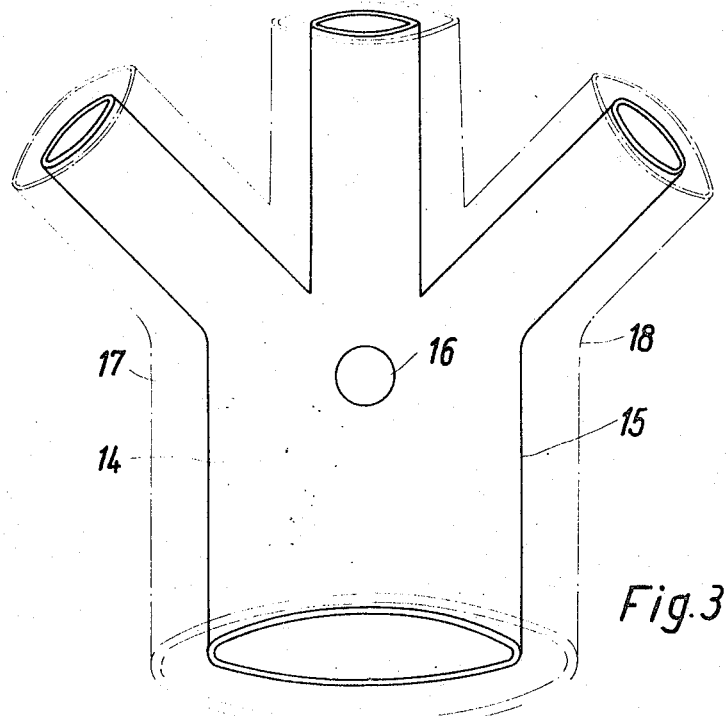
FIG. 3 is a mold which is suitable for the manufacture of potheads for cables in accordance with the invention.

For this example, a mold 14 as shown in FIG. 3 was used, which permits of the manufacture of cross-linked potheads for cables.

The wall of the molded article is indicated at 15 and the sprue at 16.

In accordance with known injection molding practice, the mold 14 comprises four cores and has a parting plane disposed in the plane of the drawing. Just as with the mold used in Example 1, the mold 14 is provided with heating cartridges.

A second, larger mold 17 is made, which compirses an outer mold wall 18, which is indicated in dotted lines in FIG. 3. This second mold may be lighter and the cores may be loose. The mold is provided with the conventional cooling devices.

In the manufacture of the cross-linked moldings, the mold 14 is mounted on an injection molding machine as is indicated in Example 1.

In a conventional high-speed mixer, a plastics material powder based on an ethylene-vinyl acetate copolymer (Lupolen V; BASF) and having a density of 0.93 gram per cubic centimeter and a melt index MFI 190/2 of 3.4–4.6 grams per 10 minutes was mixed for two minutes with 2% by weight lauroyl peroxide, which was previously dispersed in an equal amount of a conventional phthalate plasticizer (Laurox-Paste; Oxydo, Emmerich-on-Rhine) and which had been mixed with an equal amount of paraffin oil for an improved handling.

The mixture was charged through the barrel hopper 2 shown in FIG. 1, into the barrel 3 of the injection molding machine 1. Pressurized hot water flowing through the pressure water jacket 4 was used to heat the barrel to 60° C. The screw-plunger 5 was operated to inject the mixture under a pressure of 2200 kilograms per square centimeter through a nozzle 6 (sprue bushing) 2 millimeters in diameter into the closed mold 7 within 3 seconds. The injected material was heated to 150° C. in passing through the sprue bushing. The mold had been preheated to 160° C.

The mold was opened after 3 minutes, whereafter the cross-linked molding, which was still hot, was removed. The yellowish transparent molding had a rubberlike elasticity.

The larger cores were now forced into the mold article. The molded article and the cores embedded therein were then placed into the larger mold, which is indicated in dotted lines in FIG. 3. The larger mold was closed with the aid of clamps and immersed into cold water.

The mold containing the cooled molded article can be removed from the water after two minutes and can then be opened. The molded article still had a rubberlike elasticity but was much harder and no longer transparent but yellowish and opaque. The cross-linked molding was placed over the end of a three-conductor cable by threading the individual conductors through each of the three small openings. The entire assembly was then heated to 120° C. so that the molding shrunk closely and tightly onto the cable end. The cable diameter was suitably set at about 5 millimeters larger so that the expanded molding, which is about 10 millimeters larger, closely contacts the cable when it has been fitted on the cable and heat-shrunk. Similar remarks apply to the three smaller openings of the molding. The conductors must be a tight fit in these openings. This can easily be ensured by the selection of an appropriate diameter for the opening in the molded article.

EXAMPLE 3

In this example, the same mold, shown in FIG. 2, was used as in Example 1. In the conventional high-speed mixer, polypropylene powder (Novolen KR 1300P; BASF) having a density of 0.93 gram per cubic centimeter and a melt index (MFI 230° C./2.16 kilograms) below 0.1 gram per 10 minutes was intimately mixed for 2 minutes with 0.3% by weight of an aralkyl peroxide powder (Perkadox 14; Oxydo, Emmerich-on-Rhine) with an addition of 1% by weight of roll sulfur.

The mixture was charged through the barrel hopper 2 shown in FIG. 1, into the barrel 3 of a conventional injection molding machine 1 for thermosetting materials. The barrel was heated to a temperature of 120° C. The screw-plunger 5 was operated to inject the mixture under a pressure of 1800 kilograms per square centimeter within 4 seconds through a nozzle 6, which was 4 millimeters in diameter, into the mold 7, which had been preheated to 250° C. The temperature of the mixture was raised to 230° C. by the injection. The cross-linked molding, which was still hot, was removed from the mold after 3 minutes.

The molded article was translucent, of yellowish opaque appearance, and had rubberlike elasticity. When the article had cooled completely, it was hard and yellowish in appearance. It had a higher softening temperature than the molded articles made in Example 1. The article had excellent chemical and weather resistance and was not susceptible to stress crack corrosion.

The advantages which are afforded by the invention reside mainly in that it provides a simple process of manufacturing cross-linked moldings of any desired size from thermoplastic materials.

It was surprising and not to be expected, in view of the state of the art, that a rapid and sudden temperature rise of the polymer molding material-peroxide mixture to above the decomposition temperature of the peroxide accompanied by the injection of the mixture into the mold enables the manufacture of substantially uniformly cross-linked molded articles having high dimensional stability.

The process according to the invention makes high speed operation possible. The sudden temperature rise during the injection of the molding composition into the mold does not result in decomposition of the cross-linking agent because there is insufficient time for such decomposition. Hence, the cross-linking reaction cannot be initiated to any appreciable extent and will not take place until the composition has left the nozzle and entered the preheated mold. In the previous practice, the peroxide was thoroughly incorporated into the polymer molding material when such has been plasticized by heat prior to injection molding because uniformly cross-linked products can be obtained only if the cross-linking agent is contained in the polymer material in a highly uniform distribution.

Particularly with polymer molding materials having a high softening point, this practice of plasticizing and then mixing with peroxide prior to molding in a premature decomposition of the cross-linking agent so that the injection molding nozzles became clogged whereby obtaining non-uniformity cross-linked products.

This danger is eliminated by the process according to the invention, in which substantially any synthetic thermoplastic polymer can be used, including those having a high melting point, as well as all conventional chemical cross-linking agents, particularly organic peroxides.

The process permits of the manufacture of conventional cross-linked molded articles, such as T's, slabs, etc. The hot molded articles removed from the mold have such a high rubberlike elasticity that they can be compressed and stretched and, while still in a hot state, can be introduced into or fitted over other parts of preformed plastic articles or metal parts. Hence, linings may be made for and fitted on intricate moldings. Besides, undercut molded articles can be made because the molded article can be deformed to a large extent in the hot state and such deformation will not damage the article nor change the shape which hase been fixed during the cross-linking reaction.

The elastic rubbery molded articles obtained by the process according to the invention can be particularly well expanded and subsequently shrunk. These molded articles are of special interest in the manufacture of potheads for cables or of functional coverings for use in high-power and/or low-power electrical engineering.

It is possible and practical to vary the amount of peroxide added in order to manufacture molded articles varying greatly in their degree of cross-linking. The degree of cross-linking may be ascertained by conventional methods, e.g., by contacting the molded article with boiling Decalin. Molded articles for use as solid bodies will have optimum properties if the contact with boiling Decalin indicates the presence of about 3% soluble matter so that the degree of cross-linking is about 97%.

What is claimed is:

1. In the process of forming a molded article of a cross-linked thermoplastic polymer by mixing a free radical generating cross-linking agent with a thermoplastic olefin polymer; and molding such mixture to form a cross-linked article; the improvement which comprises mixing said polymer and said free radical generator in the solid state and at a temperature of about 20 to 110° C. which is less than the activation temperature of said free radical generator and less than the melting point of said thermoplastic polymer; conveying the mixture at a temperature of about 20 to 110° C; injecting said solid mixture, through at least one restricted nozzle having a diameter of about 2 to 8 millimeters under a pressure of about 1800 to 3000 kilogram/centimeter$^2$, the polymer being heated during injection to a temperature of about 180 to 300° C. which temperature is above the melting point of said thermoplastic polymer and above the activation temperature of said free radical generator, into a mold preheated to a temperature of about 180 to 300° C. to mold said thermoplastic polymer and sufficient to cause cross-linking thereof; molding and cross-linking said mixture in said mold for a time sufficient to form said molded cross-linked article, removing the hot, cross-linked thermoplastic molded article from said mold, and force cooling said article.

2. A process according to claim 1, wherein at least one member selected from the group consisting of sulfur and carbon compounds having at least one olefinic double bond is added to said mixture.

3. A process according to claim 1, wherein material selected from the group consisting of processing aids, fillers, lubricants, dyestuffs, pigments, stabilizers improving the resistance to light and heat, accelerators, plasticizers, hardeners, reinforcing means, inflammability-improving agents and agents imparting antistatic properties are added to the mixture.

4. A process according to claim 1, wherein said injection molding is provided by a screw feed.

5. A process according to claim 1, wherein said injection molding is provided by a plunger feed.

6. A process according to claim 1, wherein said nozzle has an orifice which is 2–8 millimeters in diameter.

7. A process according to claim 1 wherein said mixture is injection molded through said nozzle within a time of 1 to 6 seconds and under a pressure of 1800 to 3000 kilograms per square centimeter into a mold and wherein the friction of the mixture passing through the nozzle increases the temperature of the mixture to about 180–300° C.

References Cited
UNITED STATES PATENTS

| | | | |
|---|---|---|---|
| 3,265,800 | 8/1966 | Trunk | 264—328 |
| 3,107,234 | 10/1963 | Stewart | 264—328 X |
| 3,079,638 | 3/1963 | Mille | 264—329 X |
| 2,972,780 | 2/1961 | Boonstra | 264—328 |
| 2,296,295 | 9/1942 | Shaw | 264—329 |

ROBERT F. WHITE, Primary Examiner

R. R. KUCIA, Assistant Examiner

U.S. Cl. X.R.

264—25, 237, 329